United States Patent
Liu (10) Patent No.: US 9,724,928 B2
(45) Date of Patent: Aug. 8, 2017

(54) METHOD, SYSTEM AND MEMORY CHIP FOR GENERATING CHECKOUT VALUE

(71) Applicant: Apex Microelectronics Co., Ltd., Zhuhai (CN)

(72) Inventor: Weichen Liu, Zhuhai (CN)

(73) Assignee: Apex Microelectronics Co., Ltd. (CN)

( * ) Notice: Subject to any disclaimer, the term of this patent is extended or adjusted under 35 U.S.C. 154(b) by 0 days.

(21) Appl. No.: 14/707,404

(22) Filed: May 8, 2015

(65) Prior Publication Data

US 2015/0324668 A1    Nov. 12, 2015

(30) Foreign Application Priority Data

May 9, 2014  (CN) .......................... 2014 1 0196938

(51) Int. Cl.
| | | |
|---|---|---|
| *G06K 15/12* | (2006.01) | |
| *G06K 15/10* | (2006.01) | |
| *G06K 15/00* | (2006.01) | |
| *B41J 2/175* | (2006.01) | |

(52) U.S. Cl.
CPC ........ *B41J 2/17546* (2013.01); *G06K 15/102* (2013.01); *G06K 15/12* (2013.01); *G06K 15/407* (2013.01)

(58) Field of Classification Search
CPC .... G06K 15/407; G06K 15/102; G06K 15/12; B41J 2/17546
See application file for complete search history.

(56) References Cited

U.S. PATENT DOCUMENTS

2015/0139668 A1*  5/2015  Sugiyama .......... G03G 15/0266
                                                                  399/12

FOREIGN PATENT DOCUMENTS

| CN | 101259791 A | 9/2008 |
|---|---|---|
| CN | 101782739 A | 7/2010 |
| CN | 101794110 A | 8/2010 |
| CN | 201689284 U | 12/2010 |
| CN | 102173233 A | 9/2011 |
| CN | 102189810 A | 9/2011 |
| CN | 102658724 A | 9/2012 |
| CN | 103240999 A | 8/2013 |

(Continued)

*Primary Examiner* — Iriana Cruz
(74) *Attorney, Agent, or Firm* — Lerner, David, Littenberg, Krumholz & Mentlik, LLP (57) ABSTRACT

A method, a system and a memory chip for generating a verification value, which can eliminate the defect of time consuming and high power consumption of the existing memory chip for generating verification value, are provided according to the present disclosure. The method comprises the following steps: a frequently changing data relating to an imaging cartridge is acquired; an intermediate verification data pre-generated based on infrequently changing data is acquired; the frequently changing data and the intermediate verification data are calculated through a predetermined algorithm, and thus a verification value is obtained. A step of calculating the infrequently changing data relating to the imaging cartridge is omitted according to the present disclosure, and thus the calculation amount for acquiring the verification value can be reduced, the calculation efficiency can be improved, the calculation time and the response time of the entire printing and imaging apparatus can be shortened, and the power consumption of the memory chip can be reduced.

18 Claims, 3 Drawing Sheets

(56) References Cited

FOREIGN PATENT DOCUMENTS

| CN | 103268060 A | 8/2013 |
|----|-------------|--------|
| CN | 103753963 A | 4/2014 |
| EP | 2607082 A1 | 6/2013 |
| JP | 2006262065 A | 9/2006 |
| JP | 2010136273 A | 6/2010 |

* cited by examiner

METHOD, SYSTEM AND MEMORY CHIP FOR GENERATING CHECKOUT VALUE

CROSS-REFERENCE TO RELATED APPLICATIONS

The present application claims priority from Chinese Application No. 201410196938.5 filed May 9, 2014, the disclosure of which is hereby incorporated herein by reference.

BACKGROUND OF THE INVENTION

The present disclosure relates to a printing and imaging apparatus, particularly to a method, a system and a memory chip for generating a verification value.

With respect to a printing and imaging apparatus, such as an inkjet printer, an electrophotographic printer (including laser printer and LED printer), and a photocopier, etc., printing supplies thereof are usually mounted in a removable manner, so that the user can replace the printing supplies and maintain the apparatus after the supplies run out. The printing supplies comprise an ink cartridge, a toner cartridge, and a drum cartridge, which are collectively called as imaging cartridge.

In order to record the states of the imaging cartridges, so that they can be managed centrally by the printing and imaging apparatus, a memory chip is mounted thereon. The memory chip stores information about the imaging cartridge, such as the product model, colors and types of the recording materials (such as ink and toner), and the production date, etc.

In this case, the printing and imaging apparatus can acquire the situation of the imaging cartridge by reading the information in the memory chip. Since the imaging cartridge works under hostile environment, such as vibration and humid powder, data in the memory chip on the imaging cartridge will fluctuate. Obviously, if the printing and imaging apparatus needs to read all the information in the memory chip before executing each printing operation, the ready time of the printing operation will be too long, rendering low operation efficiency.

In order to avoid the above problems, current printing and imaging apparatuses in the industry only read a part of the data and verification value from the memory chip before executing the printing operation. The memory chip obtains the verification value by calculating all the data stored therein through universal MD5 algorithm. The printing and imaging apparatus can determine whether the data stored in the memory chip is normal through reading the verification value.

When the printing and imaging apparatus requests to read the verification value, the memory chip should calculate all the data stored therein before obtaining the verification value. Such a calculation without taking the characteristics of the data into consideration is time consuming, and thus fails to follow the trend of quick response of electronic apparatus. In addition, the calculation of the verification value also wastes electricity power. In this case, with respect to a memory chip powered by a battery, its service life will be shortened.

BRIEF SUMMARY OF THE INVENTION

The technical problem to be solved by the present disclosure is to eliminate the defects of time consuming and high power consumption during the calculation of a verification value.

In order to solve the above technical problem, according to a first aspect of the present disclosure, a method for generating a verification value by a memory chip based on stored data relating to an imaging cartridge is provided, wherein the data relating to the imaging cartridge comprises frequently changing data and infrequently changing data, wherein the method comprises the steps of acquiring the frequently changing data, acquiring intermediate verification data that is previously generated based on the infrequently changing data, and calculating the frequently changing data and the intermediate verification data through a predetermined algorithm, and obtaining the verification value.

The intermediate verification data that is generated based on the infrequently changing data in advance comprises calculating the infrequently changing data through the predetermined algorithm in advance, and obtaining the intermediate verification data.

The method comprises before acquiring the frequently changing data and the intermediate verification data, defining data that frequently changes during the use of the imaging cartridge as frequently changing data, and data that will not frequently change during the use of the imaging cartridge as infrequently changing data.

The method comprises receiving a first adjustment operation for adjusting information in the frequently changing data into infrequently changing data, and adjusting the information in the frequently changing data into infrequently changing data based on the first adjustment operation, and/or receiving a second adjustment operation for adjusting information in the infrequently changing data into frequently changing data, and adjusting the information in the infrequently changing data into frequently changing data based on the second adjustment operation.

The method comprises determining whether the infrequently changing data changes, when the infrequently changing data changes, calculating the changed infrequently changing data through the predetermined algorithm, and updating the intermediate verification data with the calculation result obtained, or when the infrequently changing data changes, calculating the changed infrequently changing data and the frequently changing data through the predetermined algorithm, and obtaining the verification value.

The step of determining whether the infrequently changing data changes, comprises determining whether the memory chip is rewritten in a testable way, determining whether a continuous operating time of the memory chip reaches or exceeds a preset duration, or determining whether the current infrequently changing data is the same as the infrequently changing data at the time when the intermediate verification data is previously generated, wherein changes are determined to have occurred to the infrequently changing data when the memory chip is rewritten in testable way, when the continuous operating time of the memory chip reaches or exceeds the preset duration, or when the current infrequently changing data is different from the infrequently changing data at the time when the intermediate verification data is generated previously.

The method comprises calculating the current infrequently changing data through a predetermined algorithm, and obtaining a calculation result, and updating the intermediate verification data with said calculation result, or updating the intermediate verification data with said calculation result when the calculation result is different from the intermediate verification data.

The present disclosure further provides system for generating a verification value by a memory chip based on stored data relating to an imaging cartridge, wherein the data relating to the imaging cartridge comprises frequently changing data and infrequently changing data, wherein the system comprises an acquisition module for acquiring the frequently changing data, and intermediate verification data that is previously generated based on the infrequently changing data, and a calculation module for calculating the frequently changing data and the intermediate verification data through a predetermined algorithm, and obtaining the verification value.

The system comprises a preprocessing module for calculating the infrequently changing data through the predetermined algorithm, and obtaining the intermediate verification data.

The system comprises a defining module for defining data that frequently changes with the use of the imaging cartridge as frequently changing data, and data that would not frequently change with the use of the imaging cartridge as infrequently changing data before acquiring the frequently changing data and the intermediate verification data.

The system comprises a receiving module for receiving a first adjustment operation for adjusting information in the frequently changing data into infrequently changing data, and/or a second adjustment operation for adjusting information in the infrequently changing data into frequently changing data, and an adjustment module for adjusting the information in the frequently changing data into infrequently changing data based on the first adjustment operation, and adjusting the information in the infrequently changing data into frequently changing data based on the second adjustment operation.

The system comprises a determination module for determining whether the infrequently changing data changes, and an update module for calculating changed infrequently changing data through the predetermined algorithm when changes are determined to have occurred to the infrequently changing data by the determination module, and updating the intermediate verification data with the calculation result obtained, or for calculating changed infrequently changing data and the frequently changing data through the predetermined algorithm when changes are determined to have occurred to the infrequently changing data by the determination module, and obtaining the verification value.

The determination module determines whether the memory chip can be rewritten in a testable way, and determines that changes have occurred to the infrequently changing data when the memory chip is rewritten in a testable way, determines whether the continuous operating time of the memory chip reaches or exceeds a preset duration, and determines that changes have occurred to the infrequently changing data when the continuous operating time of the memory chip reaches or exceeds the preset duration, or determines whether the current infrequently changing data is the same as the infrequently changing data at the time when the intermediate verification data is previously generated, and determines that changes have occurred to the infrequently changing data when the current infrequently changing data is different from the infrequently changing data at the time when the intermediate verification data is previously generated.

The system comprises an intermediate processing module for calculating the current infrequently changing data through the predetermined algorithm, and obtaining a calculation result, and an update module for updating the intermediate verification data with the calculation result, or updating the intermediate verification data with the calculation result when the calculation result is different from the intermediate verification data.

The present disclosure further provides a memory chip comprising the above system for generating a verification value, wherein the memory chip further comprises a first memory unit for storing frequently changing data, and a second memory unit for storing intermediate verification data that is generated based on infrequently changing data.

The memory chip further comprises a third memory unit for storing the infrequently changing data.

As compared with the prior art, according to an example of the present disclosure, the infrequently changing data relating to the imaging cartridge can be calculated in advance, and an intermediate verification data is obtained and stored in the memory chip. When the printing and imaging apparatus requests the memory chip to provide the verification value, the intermediate verification data and the frequently changing data relating to the imaging cartridge are calculated in order to obtain the verification value. In this case, the step for calculating the infrequently changing data can be omitted, and thus the calculation amount for calculating the verification value can be reduced, the calculation efficiency can be improved, and the calculation time and the entire response time of the printing and imaging apparatus can be shortened, thereby the power consumption of the memory chip can be lowered. According to an example of the present disclosure, the frequently changing data and the infrequently changing data relating to the imaging cartridge can also be adjusted, so that the user can conduct a custom setup on the apparatus based on specific requirements, thereby the range of application of the apparatus can be widened, and the user experience can be improved.

Other features and advantages of the present disclosure will be further explained in the following description and partially become self-evident therefrom, or be understood through the embodiments of the present disclosure. The objectives and advantages of the present disclosure will be achieved through the structure and/or procedure specifically pointed out in the description, claims, and the accompanying drawings.

BRIEF DESCRIPTION OF THE DRAWINGS

The accompanying drawings, which constitute a part of the description, are provided for further understanding the technical solution of the present disclosure and that of the prior art. The accompanying drawings describing the examples of the present disclosure are used to explain the technical solution of the present disclosure together with the examples, they should not be construed as limitations thereto. In the drawings.

DETAILED DESCRIPTION

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

In addition, the steps of a method as shown in the accompanying drawing can be executed in a computer system, such as a set of computer executable instructions. Although certain logical order of the steps has been indicated, under certain circumstances, the steps can be executed in a different order from that shown in the accompanying drawing.

Figure 1:
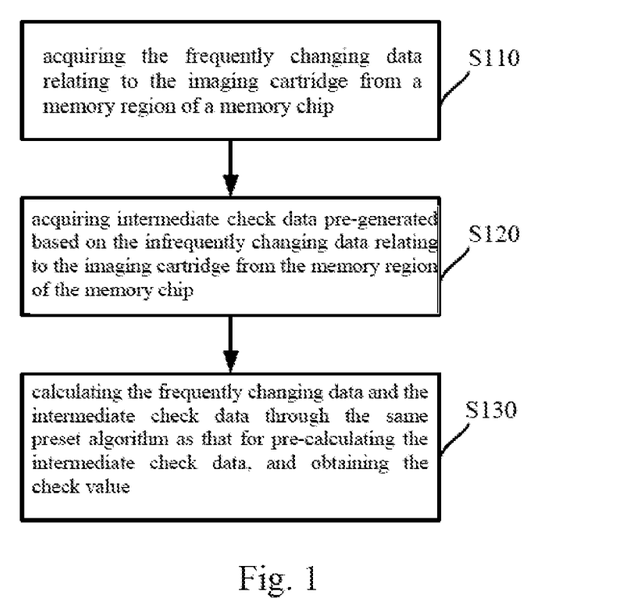
FIG. 1 is a schematic flow chart of a method for generating verification value according to an embodiment of the present disclosure, FIG. 2 schematically shows a structure of a system for generating the verification value according to an embodiment of the present disclosure, and FIG. 3 schematically shows a structure of a memory chip according to an embodiment of the present disclosure.

A method for generating a verification value according to an embodiment of the present disclosure is mainly used for the memory chip to generate a verification value based on data stored therein which is related to an imaging cartridge. As shown in FIG. 1, the method for generating the verification value according to the embodiment of the present disclosure mainly comprises the following steps.

In step S110, frequently changing data relating to the imaging cartridge is acquired from a memory region of the memory chip.

In step 120, intermediate verification data that is generated based on infrequently changing data previously is acquired from the memory region of the memory chip.

In an embodiment of the present disclosure, the data relating to the imaging cartridge stored in the memory chip includes frequently changing data and infrequently changing data. The intermediate verification data is obtained by calculating the infrequently changing data relating to the imaging cartridge previously through a predetermined algorithm.

In step 130, the frequently changing data and the intermediate verification data are calculated through the same predetermined algorithm as that for calculating the intermediate verification data previously, and thus the verification value is obtained.

The data in the memory chip relating to the imaging cartridge mainly includes the number of pages printed, the usage amount of ink, the surplus of ink, the identifying information of the imaging cartridge, the ink volume, the name of the manufacturer, as well as the production date.

The data relating to the imaging cartridge according to an example the present disclosure, including the number of pages printed, the usage amount of ink, and the surplus of ink, etc., which would frequently changes (for example, changes would occur for more than twice) with the use of the imaging cartridge, is defined as frequently changing data. The data relating to the imaging cartridge, including the identifying information of the imaging cartridge, the ink volume, the manufacturer, and the production date, which will not frequently change (for example, the frequency of changes is less than twice) with the use of the imaging cartridge, is defined as infrequently changing data.

In an embodiment according to the present disclosure, the frequently changing data and the infrequently changing data in the memory chip relating to the imaging cartridge can be different according to different operating frequencies and different application occasions of the printing and imaging apparatus, in which the memory chip is disposed, and can be appropriately adjusted according to the abovementioned factors. For example, the manufacturer of the memory chip can also custom define the ink volume as infrequently changing data, and the rest information on the imaging cartridge, including the identifying information, the manufacturer, the production date, the number of pages printed, the usage amount of ink, and the surplus of ink of the imaging cartridge as the frequently changing data.

It should be noted that for a printing and imaging apparatus under a given application occasion, the frequently changing data and the infrequently changing data in the memory chip relating to the imaging cartridge are certain for an ordinary person skilled in the art. One skilled in the art can clearly and accurately determine the data relating to the imaging cartridge as frequently changing data and infrequently changing data in a printing and imaging apparatus under the given situation.

In addition, methods for determining the frequently changing data and the infrequently changing data relating to the imaging cartridge can be different according to different situations. The frequently changing data and the infrequently changing data relating to the imaging cartridge can be adjusted on account of the specific application occasion.

For example, information about the initial installation date of the imaging cartridge can be defined as frequently changing data when the memory chip has not been used. After the memory chip is mounted to the printing and imaging apparatus, the printing and imaging apparatus writes the current date into said information. The specific initial installation date cannot be modified once it is written as the data, and thus can be defined as infrequently changing data. For another example, information about an alert on the number of pages left for printing of the imaging cartridge can be defined as infrequently changing data when there is sufficient amount of ink in the ink cartridge. When the printer detects an alert for the surplus of ink reaches a warning level, it writes the alerting information into the memory chip. At this moment, the alert on the number of pages left for printing begins to record the number of pages that can be printed in a diminishing manner. At this moment, the alert on the number of pages left for printing can be defined as frequently changing data.

According to an example of the present disclosure, a first adjustment operation for adjusting information in the frequently changing data into infrequently changing data can be received. Then, information in the frequently changing data is adjusted into infrequently changing data based on the first adjustment operation. According to an embodiment of the present disclosure, a second adjustment operation for adjusting information in the infrequently changing data into frequently changing data can be received. Then, information in the infrequently changing data is adjusted into frequently changing data based on the second adjustment operation. Information in the frequently changing data and the infrequently changing data can be adjusted, so that the user can perform custom setting based on specific requirements, thereby the range of application can be expanded and the user experience can be improved.

The identifying information of the imaging cartridge can be color information on the recording materials, or device address of a memory unit, or any other information that can differentiate different types of imaging cartridges. The memory unit is a common nonvolatile memory, such as EPROM, EEPROM, FLASH, ferroelectric memory, or phase change memory, etc. The memory unit can also be a volatile memory with battery, such as SRAM with a battery or capacitor, or DRAM with a battery or capacitor.

According to an embodiment of the present disclosure, the predetermined algorithm is configured based on the requirements for the verification of the printing and imaging apparatus. Common algorithm includes CRC, odd-even check, XOR or checksum, etc.

The precision of the verification value obtained by calculating all the data stored in an original memory chip (designed and manufactured by the manufacturer of the printing and imaging apparatus) based on the predetermined algorithm is doubtlessly the highest. However, although all data stored in the original memory chip comprises said frequently changing data and infrequently changing data, the data does not comprise an intermediate verification data calculated based on the infrequently changing data relating to the imaging cartridge. Nor does the prior art comprise the processes of generating the intermediate verification data by calculating the infrequently changing data relating to the imaging cartridge in advance and storing the intermediate verification data. In addition, at present, data stored in the memory chip is not differentiated according to whether it frequently changes with the use of the imaging cartridge.

According to an example of the present disclosure, intermediate check data obtained by calculating the infrequently changing data relating to the imaging cartridge can be stored in the memory chip during the manufacturing or design thereof. When the printing and imaging apparatus requests a verification value to be provided by the memory chip, it is unnecessary for the memory chip to calculate the infrequently changing data relating to the imaging cartridge. Instead, the memory chip can invoke the intermediate verification data that is generated previously and stored therein, and calculate the intermediate verification data and the frequently changing data relating to the imaging cartridge, and thus the process of calculating the infrequently changing data relating to the imaging cartridge can be omitted, thereby the calculated amount can be reduced, the calculation efficiency can be improved, the whole time for calculation and response of the printing and imaging apparatus can be shortened, and the power consumption of the memory chip can be reduced.

In order to guarantee the precision of the verification value sent to the printing and imaging apparatus by the memory chip, the influence of certain variable factors on the verification value during calculation will be taken into account in an embodiment according to the present disclosure.

According to an example of the present disclosure, whether the infrequently changing data changes can be determined. When changes are determined to have occurred to the infrequently changing data, the changed infrequently changing data is calculated through the corresponding predetermined algorithm, and a calculation result is obtained and used to update the previous intermediate verification data. Subsequently, the frequently changing data and the updated intermediate verification data are calculated with a corresponding algorithm, and a verification value calculated based on the changed infrequently changing data is obtained. Alternatively, when changes are determined to have occurred to the infrequently changing data, the verification value based on the changed infrequently changing data can also be obtained through calculating the changed infrequently changing data and the frequently changing data through the predetermined algorithm.

The determination of whether the infrequently changing data changes can be conducted through several approaches.

For example, the determination of whether the infrequently changing data changes can be conducted through determining whether a test rewriting is conducted on the memory chip. When the printing and imaging apparatus performs a test rewriting on the memory chip, it is possible that the infrequently changing data has also been rewritten. At this moment, the intermediate verification data stored in the memory chip does not necessarily correspond to the infrequently changing data after the test rewriting. Thus, when a test rewriting is conducted on the memory chip, the conclusion that changes have occurred to the infrequently changing data can be drawn.

For another example, the determination of whether the infrequently changing data changes can be conducted through determining whether a continuous operating time of the memory chip reaches or exceeds a predetermined duration. The predetermined duration can be half an hour or an hour, etc. It is possible that the data that does not frequently change with the use of the imaging cartridge also changes occasionally with the constant use of the imaging cartridge. Therefore, after the printing and imaging apparatus is used continuously for a period of time, certain changes can also occur to partial information in the infrequently changing data. According to an example of the present disclosure, the continuous operating time of the memory chip can be recorded. When the continuous operating time of the memory chip reaches or exceeds a predetermined duration, changes can be determined to have occurred to the infrequently changing data.

Further, the determination of whether the infrequently changing data changes can also be conducted through directly comparing whether the current infrequently changing data is the same as the infrequently changing data at the time when the intermediate verification data is generated in advance. If the current infrequently changing data is different from the infrequently changing data at the time when the intermediate verification data is generated in advance, conclusion that changes have occurred to the infrequently changing data can be drawn.

According to an example of the present disclosure, the current infrequently changing data relating to the imaging cartridge can also be calculated regularly or irregularly through the same algorithm as that used for generating the intermediate verification value in advance. Subsequently, the calculation result obtained is compared with the intermediate verification value obtained based on the previous infrequently changing data. If the calculation result is the same as the intermediate verification value obtained based on the previous infrequently changing data, the current infrequently changing data is the same as the previous infrequently changing data, and thus no change occurs to the infrequently changing data. If the calculation result is different from the intermediate verification value obtained based on the previous infrequently changing data, the current infrequently changing data has changed as compared with the previous infrequently changing data. When the current infrequently changing data has changed as compared with the previous infrequently changing data, the intermediate verification data obtained based on the previous infrequently changing data is updated with a calculation result obtained by calculating the current infrequently changing data relating to the imaging cartridge, thereby when calculating the final verification value involving the intermediate verification data that corresponds to the current infrequently changing data, the precision thereof can be guaranteed.

Of course, in order to guarantee the precision of the verification value, and at the same time reduce the steps of intermediate calculation and improve the calculation efficiency, the current infrequently changing data relating to the imaging cartridge can also be calculated regularly or irregularly through the same algorithm as that used for calculating the intermediate verification data in advance and the verification value, and the calculation result obtained is used to directly update the intermediate verification data obtained based on the previous infrequently changing data instead of being compared therewith. Thus, the step for comparing the calculation result with the intermediate verification data obtained based on the previous infrequently changing data can be omitted. In this case, whether the calculation result is the same as the intermediate verification data obtained based on the previous infrequently changing data or not, the calculation result is the intermediate verification data corresponding to the current infrequently changing data relating to the imaging cartridge, thereby the precision of the verification value subsequently calculated can be guaranteed.

The calculation of the infrequently changing data relating to the imaging cartridge can be performed when the printing and imaging apparatus is idle, so that the influence of the calculation performed during the working hour of the printing and imaging apparatus on the operation efficiency thereof can be avoided.

In order to better understand the present disclosure, the following examples are illustrated.

Assume that the original memory chip stores 4 bytes of data, namely, 00110101, 10010110, 01010011, and 10110100. The first byte 00110101 is frequently changing data relating to the imaging cartridge, and the latter three are infrequently changing data. The verification value to be read by the printing and imaging apparatus is obtained by calculating the bytes in sequence through XOR algorithm. According to an example of the present disclosure, the three bytes infrequently changing data are calculated through a predetermined algorithm, i.e., XOR algorithm (10010110) XOR(01010011)XOR(10110100), and an intermediate check data (01110001) is obtained. The intermediate verification data 01110001 is stored in a memory region in the memory chip.

When the printing and imaging apparatus requests to read the verification value, or when the memory chip requests to automatically send the verification value to the printing and imaging apparatus, the memory chip only needs to calculate the first byte 00110101 and the intermediate verification data 01110001 stored therein through XOR algorithm. It is known that (00110101) XOR (01110001)=(01000100), and thus the verification value is 01000100. As compared with the prior art, in which the XOR algorithm is performed three times on the four bytes of data, it is only necessary to perform one XOR algorithm on the two data according to the example of the present disclosure, and thus the verification value can be sent to the printing and imaging apparatus promptly, thereby the calculation amount can be reduced, the calculation efficiency can be improved, the calculation time and the entire response time of the printing and imaging apparatus can be shortened, and the power consumption of the memory chip can be reduced.

Figure 2:
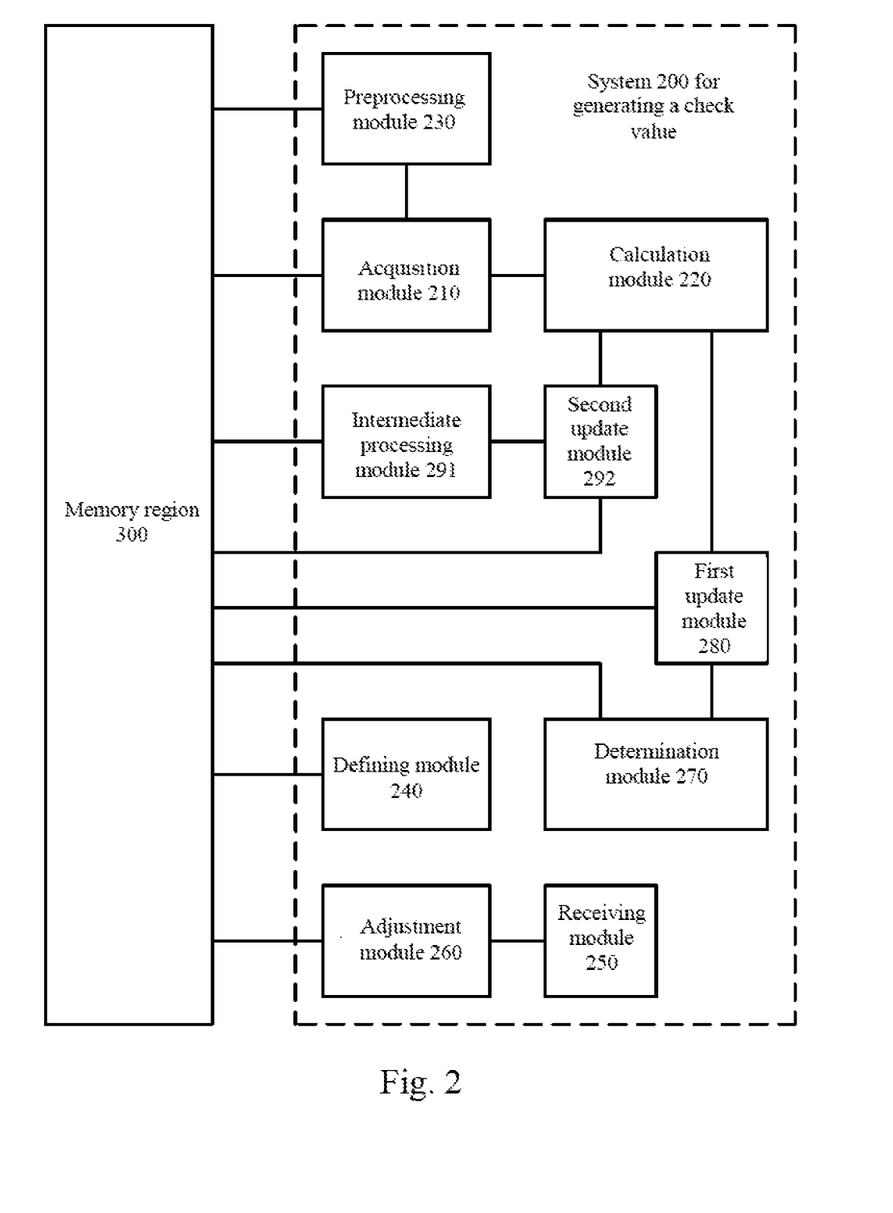

A system for generating a verification value by a memory chip based on stored data relating to an imaging cartridge according to an example of the present disclosure is provided. The data relating to the imaging cartridge comprises frequently changing data and infrequently changing data. As shown in FIG. 2, a system 200 for generating a verification value according to the example of the present disclosure mainly comprises an acquisition module 210 and a calculation module 220.

The acquisition module 210 is connected with a memory region 300 of the memory chip and acquires the frequently changing data relating to the imaging cartridge from the memory region 300 of the memory chip. The acquisition module 210 also acquires an intermediate verification data that is generated based on the infrequently changing data relating to the imaging cartridge in advance.

The calculation module 220 is connected with the acquisition module 210 and calculates the frequently changing data and the intermediate verification data through the same predetermined algorithm as that for generating the intermediate verification data based on the infrequently changing data relating to the imaging cartridge in advance, and obtains a verification value.

According to an example of the present disclosure, the memory chip stores the data relating to the imaging cartridge, including frequently changing data and infrequently changing data, in the memory region 300 thereof. As shown in FIG. 2, the system 200 for generating the verification value according to the example of the present disclosure further comprises a preprocessing module 230. The preprocessing module 230 is connected with the acquisition module 210 and the memory region 300 of the memory chip, and calculates the infrequently changing data relating to the imaging cartridge through the predetermined algorithm, and obtains the intermediate check data As shown in FIG. 2, the system 200 for generating the verification value according to an example of the present disclosure can further comprise a defining module 240 connected with the memory region 300 of the memory chip. Before the frequently changing data and the intermediate verification data are acquired by the acquisition module 210, the defining module 240 defines data that frequently changes with the use of the imaging cartridge as frequently changing data, and data that would not frequently change with the use of the imaging cartridge as infrequently changing data.

According to an example of the present disclosure, the frequently changing data and the infrequently changing data in the memory chip relating to the imaging cartridge can be different according to different operating frequency and different application occasions of the printing and imaging apparatus in which the memory chip is disposed, and can be appropriately adjusted according to the abovementioned factors. For example, the manufacturer of the memory chip can also define the ink volume as infrequently changing data, and other information on the imaging cartridge, including the identifying information, the manufacturer, the production date, the number of pages printed, the usage amount of ink, and the surplus of ink of the imaging cartridge as the frequently changing data.

As to the method for defining the frequently changing data and the infrequently changing data in the memory chip relating to the imaging cartridge, reference can be made to the above description, and thus will not be described in detail.

The system 200 for generating the verification value according to an example of the present disclosure can also make adjustment between the frequently changing data and the infrequently changing data relating to the imaging cartridge. As shown in FIG. 2, the system 200 for generating the verification value according to an example of the present disclosure can further comprise a receiving module 250 and an adjustment module 260 connected with the receiving module 250 and the memory region 300.

The receiving module 250 can receive a first adjustment operation for adjusting information in the frequently changing data relating to the imaging cartridge into infrequently changing data relating to the imaging cartridge. The adjustment module 260 adjusts the information in the frequently changing data into infrequently changing data based on the first adjustment operation.

The receiving module 250 can also receive a second adjustment operation for adjusting information in the infrequently changing data relating to the imaging cartridge into frequently changing data relating to the imaging cartridge. The adjustment module 260 adjusts the information in the infrequently changing data into frequently changing data based on the second adjustment operation.

After the adjustment is made between the frequently changing data and the infrequently changing data relating to the imaging cartridge, the infrequently changing data relating to the imaging cartridge should be re-calculated, and the intermediate verification data previously obtained should be updated with the result of the re-calculation, so that a verification value that matches the new frequently changing data and the infrequently changing data can be obtained.

According to an example of the present disclosure, the system for generating the verification value can store the intermediate verification data obtained by calculating the infrequently changing data in the memory chip relating to the imaging cartridge during the manufacturing or design thereof. When the printing and imaging apparatus requests a verification value to be provided by the memory chip, it is unnecessary for the memory chip to calculate the infrequently changing data relating to the imaging cartridge. Instead, the memory chip can calculate the intermediate verification data that is generated in advance and stored therein and the frequently changing data relating to the imaging cartridge, thereby the amount of calculation can be reduced, the calculation efficiency can be improved, the calculation and the entire response time of the printing and imaging apparatus can be shortened, and the power consumption of the memory chip can be reduced.

As shown in FIG. 2, the system 200 for generating the verification value according to an example of the present disclosure can further comprise a determination module 270 and a first update module 280.

The determination module 270 is connected with the memory region 300 and determines whether the infrequently changing data in the memory region 300 changes.

The first update module 280 is connected with the determination module 270, the calculation module 220 and the memory region 300. When changes are determined to have occurred to the infrequently changing data by the determination module 270, the first update module 280 calculates the changed infrequently changing data relating to the imaging cartridge through the predetermined algorithm. The calculation result obtained is used to update the previously generated intermediate verification data, and used for the calculation module 220 to calculate the verification value based on the changed infrequently changing data relating to the imaging cartridge.

Alternatively, when the determination module 270 determines changes have occurred to the infrequently changing data, the calculation module 220 can also calculate the changed infrequently changing data and the frequently changing data through the predetermined algorithm. In this case, the verification value based on the changed infrequently changing data can also be obtained.

The determination of whether the infrequently changing data changes by the determination module 270 can be performed through several ways.

For example, the determination module 270 can determine whether a test rewriting is performed on the memory chip. When the printing and imaging apparatus performs a test rewriting on the memory chip, it is possible that the infrequently changing data has also been rewritten. At this moment, the intermediate verification data stored in the memory chip does not necessarily correspond to the infrequently changing data after the test rewriting. Thus, when a test rewriting is determined by the determination module to have been conducted on the memory chip, the conclusion that changes have occurred to the infrequently changing data can be drawn.

For another example, the determination module 270 can determine whether the continuous operating time of the memory chip reaches or exceeds a preset duration. The predetermined duration can be half an hour or an hour, etc. The data that does not frequently change with the use of the imaging cartridge can also change occasionally with the constant use of the imaging cartridge. Thus, when the printing and imaging apparatus operates continuously for a period of time, partial information in the infrequently changing data can also change to a certain extent. According to an example of the present disclosure, the verification value is further calculated after the printing and imaging apparatus has been used for a while, so that the precision of the verification value can be guaranteed. The system 200 for generating the verification value according to an example of the present disclosure can time with respect to the continuous operating time of the memory chip. When the determination module 270 determines that the continuous operating time of the memory chip reaches or exceeds the predetermined duration, the conclusion that changes have occurred to the infrequently changing data can be drawn.

For a further example, the determination module 270 can also determine whether the current infrequently changing data is the same as the infrequently changing data at the time when the intermediate verification data is generated in advance. When the determination module 270 determines that the current infrequently changing data is different from the infrequently changing data at the time when the intermediate verification data is generated in advance, the conclusion that changes have occurred to the infrequently changing data can be drawn.

As shown in FIG. 2, the system 200 for generating the verification value according to an example of the present disclosure can further comprise an intermediate processing module 291 and a second update module 292.

The intermediate processing module 291 is connected with the memory region 300 and calculates the infrequently changing data regularly or irregularly through the same predetermined algorithm as that for calculating the intermediate verification data in advance and the verification value.

The second update module 292 is connected with the intermediate processing module 291, the calculation module 220 and the memory region 300. The second update module 292 compares the calculation result obtained by the intermediate processing module 291 with the intermediate verification data obtained based on the previous infrequently changing data. If the calculation result is the same as the intermediate verification data obtained based on the previous infrequently changing data, the current infrequently changing data relating to the imaging cartridge is the same as the previous infrequently changing data, and thus no change has occurred to the infrequently changing data. If the calculation result is different from the intermediate verification data obtained based on the previous infrequently changing data, the current infrequently changing data relating to the imaging cartridge has changed as compared with the previous infrequently changing data. When the current infrequently changing data has changed as compared with the previous infrequently changing data, the current infrequently changing data relating to the imaging cartridge is calculated, and a calculation result obtained therefrom is used to update the intermediate verification data that is obtained based on the previous infrequently changing data and stored in the memory region 300. As a result, in subsequent calculation involving the intermediate verification data that corresponds to the current infrequently changing data relating to the imaging cartridge, the precision of the verification value can be guaranteed.

In order to guarantee the precision of the verification value, and at the same time reduce the steps of intermediate calculation and improve the calculation efficiency, the current infrequently changing data relating to the imaging cartridge can also be calculated regularly or irregularly through the same algorithm as that used for calculating the intermediate verification data in advance and the verification value. The second update module 292 directly uses the calculation result obtained to update the intermediate verification data obtained based on the previous infrequently changing data instead of comparing the calculation result therewith. Thus, the step for comparing the calculation result with the intermediate verification data obtained based on the previous infrequently changing data can be omitted. In this case, whether the calculation result is the same as the intermediate verification data obtained based on the previous infrequently changing data, the calculation result is the intermediate verification data corresponding to the current infrequently changing data relating to the imaging cartridge, thereby the precision of the verification value subsequently calculated can be guaranteed.

The intermediate processing module 291 can calculate the infrequently changing data relating to the imaging cartridge when the printing and imaging apparatus is idle, so that the influence of performing the calculation while the printing and imaging apparatus is operating on the operating efficiency of the printing and imaging apparatus can be avoided.

Figure 3:
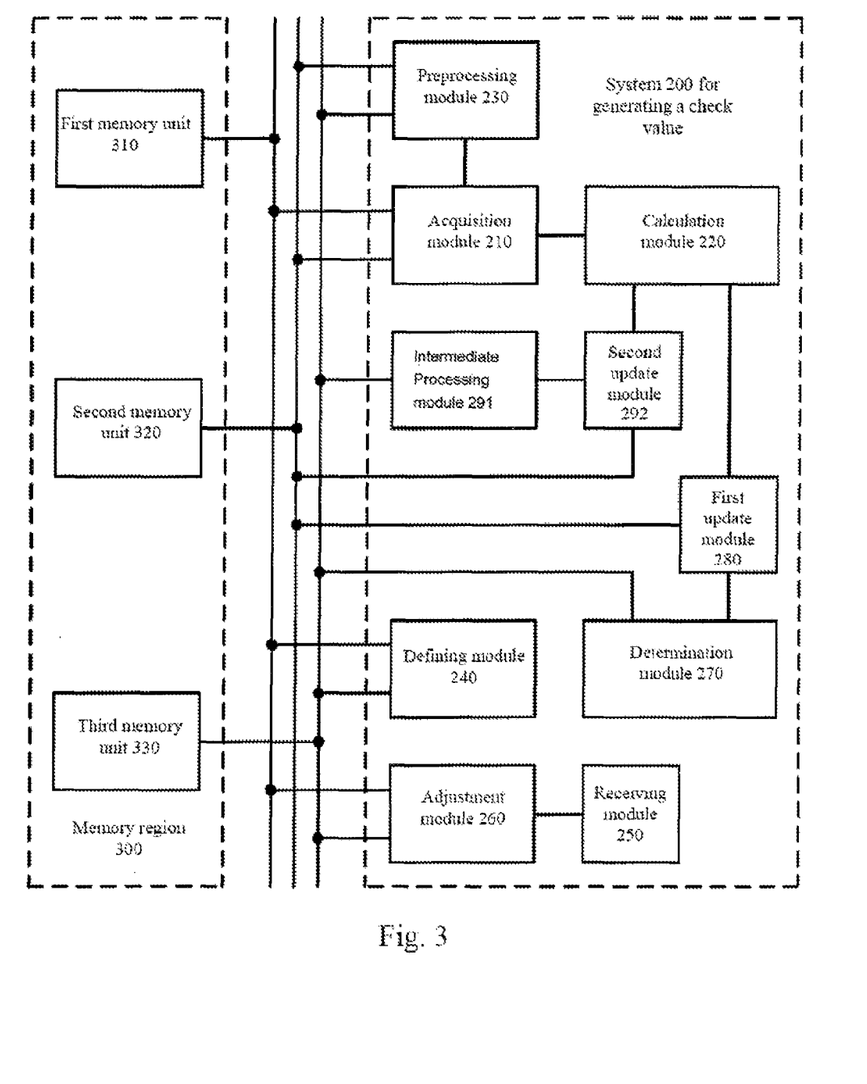

As shown in FIG. 3, the memory chip according to an example of the present disclosure comprises said system 200 for generating the verification value, as well as said memory region 300 for storing the data relating to the imaging cartridge. The memory region 300 can at least comprise a first memory unit 310 and a second memory unit 320.

The first memory unit 310 is connected with the acquisition module 210 of the system 200 for generating the verification value and stores the frequently changing data relating to the imaging cartridge.

The second memory unit 320 is connected with the acquisition module 210 of the system 200 for generating the verification value and stores the intermediate verification data that is generated based on the infrequently changing data relating to the imaging cartridge.

As shown in FIG. 3, according to an example of the present disclosure, the memory region 300 of the memory chip may further comprise a third memory unit 330 for storing the infrequently changing data relating to the imaging cartridge.

According to an example of the present disclosure, the data relating to the imaging cartridge stored by the memory chip in the memory region 300 thereof comprises frequently changing data and infrequently changing data. As shown in FIG. 3, in the memory chip according to an example of the present disclosure, the system 200 for generating the verification value may further comprise a preprocessing module 230. The preprocessing module 230 is connected with the acquisition module 210, the second memory unit 320 of the memory region 300 and the third memory unit 330. The preprocessing module 230 calculates the infrequently changing data in the third memory unit 330 relating to the imaging cartridge through the predetermined algorithm and obtains and stores the intermediate verification data in the second memory unit 320.

As shown in FIG. 3, in the memory chip according to an example of the present disclosure, the system 200 for generating the verification value may comprise a defining module 240 which is connected with the first memory unit 310 in the memory region 300 and the third memory unit 330. Before the frequently changing data and the intermediate verification data are acquired by the acquisition module 210, the defining module 240 defines data that frequently changes with the use of the imaging cartridge as frequently changing data and stores the frequently changing data in the first memory unit 310, and defines data that would not frequently change with the use of the imaging cartridge as infrequently changing data and stores the infrequently changing data in the third memory unit 330.

In the memory chip according to an example of the present disclosure, the system 200 for generating the verification value can further make adjustment between the frequently changing data and the infrequently changing data relating to the imaging cartridge. As shown in FIG. 3, the system 200 for generating the verification value according to an example of the present disclosure may further comprise a receiving module 250, and an adjustment module 260 connected with the receiving module 250, the first memory unit 310 in the memory region 300 and the third memory unit 330.

The receiving module 250 receives a first adjustment operation for adjusting information in the frequently changing data into infrequently changing data. The adjustment module 260 adjusts the information in the frequently changing data stored in the first memory unit 310 into infrequently changing data stored in the third memory unit 330 based on the first adjustment operation.

The receiving module 250 can also receive a second adjustment operation for adjusting information in the infrequently changing data into frequently changing data. The adjustment module 260 adjusts the information in the infrequently changing data stored in the third memory unit 330 into frequently changing data stored in the first memory unit 310 based on the second adjustment operation.

After the adjustment between the frequently changing data and the infrequently changing data relating to the imaging cartridge, the infrequently changing data relating to the imaging cartridge should be re-calculated. The intermediate verification data previously generated should be updated with the calculation result acquired by the above calculation, so as to calculate a verification value that matches the newly obtained frequently changing data and infrequently changing data.

The memory chip according to an example of the present disclosure can store the intermediate verification data, which is calculated based on the infrequently changing data relating to the imaging cartridge, in the second memory unit during the manufacturing or design process thereof. When the printing and imaging apparatus requests the memory chip to provide the verification value, it is not necessary for the memory chip to calculate the infrequently changing data in the third memory unit. Instead, the verification value can be obtained by calculating the intermediate verification data pre-generated and stored in the second memory unit and the frequently changing data stored in the first memory unit, and thus the calculation amount can be reduced and the calculation efficiency can be improved, thereby the calculation time and the entire response time of the printing and imaging apparatus can be shortened, and the power consumption of the memory chip can be reduced.

As shown in FIG. 3, in the memory chip according to an example of the present disclosure, the system 200 for generating the verification value can comprise a determination module 270 and a first update module 280.

The determination module 270 is connected with the third memory unit 330 in the memory region 300 and determines whether the infrequently changing data in the third memory unit 330 relating to the imaging cartridge changes.

The first update module 280 is connected with the determination module 270, the calculation module 220 and the second memory unit 320 in the memory region 300. When changes are determined to have occurred to the infrequently changing data by the determination module 270, the first update module 280 calculates the changed infrequently changing data through the predetermined algorithm. The calculation result obtained is used to update the previously generated intermediate verification data stored in the second memory unit 320, and used for the calculation module 220 to calculate the verification value based on the changed infrequently changing data relating to the imaging cartridge.

Alternatively, when changes are determined to have occurred to the infrequently changing data by the determination module 270, the calculation module 220 can also calculate the changed infrequently changing data stored in the third memory unit 330 and the frequently changing data stored in the first memory unit 310 through the predetermined algorithm. In this case, the verification value for the changed infrequently changing data can also be obtained.

The determination of whether the infrequently changing data changes by the determination module 270 can be performed through several ways.

For example, the determination module 270 can determine whether a test rewriting is performed on the memory chip. When the printing and imaging apparatus performs a test rewriting on the memory chip, it is possible that the infrequently changing data stored in the third memory unit 330 has also been rewritten. At this moment, the intermediate verification data stored in the second memory unit 320 does not necessarily correspond to the infrequently changing data after the test rewriting. Thus, when a test rewriting is determined by the determination module 270 to have been conducted on the memory chip, the conclusion that changes have occurred to the infrequently changing data can be drawn.

For another example, the determination module 270 can determine whether the continuous operating time of the memory chip reaches or exceeds a preset duration. The preset duration can be half an hour or an hour, etc. The data that does not frequently change with the use of the imaging cartridge can also change occasionally with the constant use of the imaging cartridge. Thus, when the printing and imaging apparatus operates continuously for a period of time, partial information in the infrequently changing data stored in the third memory unit 330 can also change to a certain extent. In an example according to the present disclosure, the verification value is further calculated after the printing and imaging apparatus has been used for a while, so that the precision of the verification value can be guaranteed. The system 200 for generating a verification value according to the example of the present disclosure can keep record of the continuous operating time of the memory chip. When the determination module 270 determines that the continuous operating time of the memory chip reaches or exceeds the preset duration, the conclusion that changes have occurred to the infrequently changing data can be drawn.

For a further example, the determination module 270 can also determine whether the current infrequently changing data is the same as the infrequently changing data at the time when the intermediate verification data is generated in advance. When the determination module 270 determines that the current infrequently changing data is different from the infrequently changing data at the time when the intermediate verification data is generated in advance, the conclusion that changes have occurred to the infrequently changing data can be drawn.

As shown in FIG. 3, in the memory chip according to an example of the present disclosure, system 200 for generating a verification value can further comprise an intermediate processing module 291 and a second update module 292.

The intermediate processing module 291 is connected with the third memory unit 330 in the memory region 300 and calculates the infrequently changing data in the third memory unit 330 relating to the imaging cartridge regularly or irregularly through the same predetermined algorithm as that for calculating the intermediate verification data in advance and the verification value.

The second update module 292 is connected with the intermediate processing module 291, the calculation module 220 and the second memory unit 320 in the memory region 300. The second update module 292 compares the calculation result obtained by the intermediate processing module 291 with the intermediate verification data obtained based on the previous infrequently changing data. If the calculation result is the same as the intermediate verification data obtained based on the previous infrequently changing data, the current infrequently changing data relating to the imaging cartridge is the same as the previous infrequently changing data, and thus no change has occurred to the infrequently changing data. If the calculation result is different from the intermediate verification data obtained based on the previous infrequently changing data, the current infrequently changing data relating to the imaging cartridge has changed as compared with the previous infrequently changing data. When the current infrequently changing data has changed as compared with the previous infrequently changing data, the current infrequently changing data relating to the imaging cartridge is calculated, and a calculation result acquired therefrom is used to update the intermediate verification data which is calculated based on the previous infrequently changing data and stored in the second memory unit 320. As a result, in subsequent calculation of the verification value involving the intermediate verification data that corresponds to the current infrequently changing data relating to the imaging cartridge, the precision of the verification value can be guaranteed.

In order to guarantee the precision of the verification value, and at the same time reduce the steps of intermediate calculation and improve the calculation efficiency, the current infrequently changing data relating to the imaging cartridge can also be calculated regularly or irregularly through the same algorithm as that used for calculating the intermediate verification data in advance and calculating the verification value. The second update module 292 directly uses the calculation result acquired to update the intermediate verification data, which is obtained based on the previous infrequently changing data and stored in the second memory unit 320, instead of comparing the calculation result therewith. Thus, the step for comparing the calculation result with the intermediate verification data obtained based on the previous infrequently changing data can be omitted. In this case, whether the calculation result is the same as the intermediate verification data obtained based on the previous infrequently changing data or not, the calculation result is the intermediate verification data corresponding to the current infrequently changing data relating to the imaging cartridge, thereby the precision of the verification value subsequently calculated can be guaranteed.

The intermediate processing module 291 can calculate the infrequently changing data relating to the imaging cartridge when the printing and imaging apparatus is idle, so that the influence of performing the calculation while the printing and imaging apparatus is operating on the operating efficiency of the printing and imaging apparatus can be avoided.

One skilled in the art should understand that each part in the system and/or apparatus, as well as the steps of the method according to the example of the present disclosure can be integrated in a single calculation device, or distributed in a network constituted by a plurality of calculation devices. Optionally, each part and the steps of the method can be implemented through executable program code of the calculation device. In this case, they can be stored in a memory device and executed by the calculation device; or they can be made into integrated circuit modules respectively; or a plurality of the constituent parts or steps of the method can be made into one single integrated circuit module. The present disclosure is not limited to the combination of any specific hardware and software.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for generating a verification value by a memory chip based on stored data relating to an imaging cartridge, wherein the data relating to the imaging cartridge comprises frequently changing data and infrequently changing data,
wherein the method comprises steps of:
acquiring, by a CPU inside the memory chip, the frequently changing data,
acquiring, by the CPU, intermediate verification data that is generated based on the infrequently changing data in advance through a predetermined algorithm,
calculating, by the CPU, the frequently changing data and the intermediate verification data through the same predetermined algorithm as that for calculating the intermediate verification data previously, and obtaining the verification value, and
determining, by the CPU, whether the infrequently changing data changes,
wherein, determining whether the infrequently changing data changes comprises:
determining, by the CPU, whether a test rewriting is conducted on the memory chip,
determining, by the CPU, whether a continuous operating time of the memory chip reaches or exceeds a preset duration, or
determining, by the CPU, whether the current infrequently changing data is the same as the infrequently changing data at the time when the intermediate verification data is generated in advance;
wherein changes are determined to have occurred to the infrequently changing data when the test rewriting is conducted on the memory chip, when the continuous operating time of the memory chip reaches or exceeds the preset duration, or when the current infrequently changing data is different from the infrequently changing data at the time when the intermediate verification data is generated in advance.

2. The method according to claim 1, wherein the step for acquiring the intermediate verification data that is generated based on the infrequently changing data in advance through a predetermined algorithm comprises:
calculating, by the CPU, the infrequently changing data through the predetermined algorithm in advance, and obtaining the intermediate verification data.

3. The method according to claim 1, wherein the method comprises:
before acquiring the frequently changing data and the intermediate verification data, defining data that frequently changes with the use of the imaging cartridge as frequently changing data, and data that would not frequently change with the use of the imaging cartridge as infrequently changing data.

4. The method according to claim 1, wherein the method further comprises:
receiving, by the CPU, a first adjustment operation for adjusting information in the frequently changing data into infrequently changing data, and adjusting the information in the frequently changing data into infrequently changing data based on the first adjustment operation, and/or
receiving, by the CPU, a second adjustment operation for adjusting information in the infrequently changing data into frequently changing data, and adjusting the information in the infrequently changing data into frequently changing data based on the second adjustment operation.

5. The method according to claim 1, wherein the method comprises:
when the infrequently changing data changes, calculating, by the CPU, the changed infrequently changing data through the predetermined algorithm and obtaining a calculation result, and updating the intermediate verification data with the calculation result, or
when the infrequently changing data changes, calculating, by the CPU, the changed infrequently changing data and the frequently changing data through the predetermined algorithm, and obtaining the verification value.

6. The method according to claim 1, wherein the method comprises:
calculating, by the CPU, the current infrequently changing data through the predetermined algorithm, and obtaining a calculation result, and
updating, by the CPU, the intermediate verification data with said calculation result, or updating the intermediate verification data with the calculation result when the calculation result is different from the intermediate verification data.

7. A system for generating a verification value by a memory chip based on stored data relating to an imaging cartridge, wherein the data relating to the imaging cartridge comprises frequently changing data and infrequently changing data, wherein the system is enabled by a CPU inside the memory chip and the CPU comprises:

an acquisition module for acquiring the frequently changing data, and intermediate verification data that is generated based on the infrequently changing data in advance through a predetermined algorithm, a calculation module for calculating the frequently changing data and the intermediate verification data through a predetermined algorithm, and obtaining the verification value through the same predetermined algorithm as that for calculating the intermediate verification data previously, and a determination module for determining whether the infrequently changing data changes, wherein the determination module determines whether a test rewriting is conducted on the memory chip, and determines that changes have occurred to the infrequently changing data when the test rewriting is conducted on the memory chip, determines whether the continuous operating time of the memory chip reaches or exceeds a preset duration, and determines that changes have occurred to the infrequently changing data when the continuous operating time of the memory chip reaches or exceeds the preset duration, or determines whether the current infrequently changing data is the same with the infrequently changing data at the time when the intermediate verification data is generated in advance, and determines that changes have occurred to the infrequently changing data when the current infrequently changing data is different from the infrequently changing data at the time when the intermediate verification data is generated in advance.

8. The system according to claim 7, wherein the system comprises:

a preprocessing module for calculating the infrequently changing data through the predetermined algorithm, and obtaining the intermediate verification data.

9. The system according to claim 7, wherein the system comprises:

a defining module for defining data that frequently changes with the use of the imaging cartridge as frequently changing data, and data that would not frequently change with the use of the imaging cartridge as infrequently changing data before acquiring the frequently changing data and the intermediate verification data.

10. The system according to claim 7, wherein the system comprises:

a receiving module for receiving a first adjustment operation for adjusting information in the frequently changing data into infrequently changing data, and/or a second adjustment operation for adjusting information in the infrequently changing data into frequently changing data, and an adjustment module for adjusting the information in the frequently changing data into infrequently changing data based on the first adjustment operation, and adjusting the information in the infrequently changing data into frequently changing data based on the second adjustment operation.

11. The system according to claim 7, wherein the system comprises:

an update module for calculating changed infrequently changing data through the predetermined algorithm when changes are determined to have occurred to the infrequently changing data by the determination module, and updating the intermediate verification data with the calculation result obtained, or for calculating changed infrequently changing data and the frequently changing data through the predetermined algorithm when changes are determined to have occurred to the infrequently changing data by the determination module, and obtaining the verification value.

12. The system according to claim 7, wherein the system comprises:

an intermediate processing module for calculating the current infrequently changing data through the predetermined algorithm, and obtaining a calculation result, and an update module for updating the intermediate verification data with the calculation result, or updating the intermediate verification data with the calculation result when the calculation result is different as compared with the intermediate verification data.

13. A memory chip comprising the system for generating a verification value according to claim 7, wherein the memory chip includes a CPU inside and the CPU further comprises:

a first memory unit for storing frequently changing data, and a second memory unit for storing intermediate verification data generated based on infrequently changing data.

14. The memory chip according to claim 13, further comprising:

a third memory unit for storing the infrequently changing data.

15. The memory chip according to claim 13, wherein the system comprises:

a preprocessing module for calculating the infrequently changing data through the predetermined algorithm, and obtaining the intermediate verification data.

16. The memory chip according to claim 13, wherein the system comprises:

a defining module for defining data that frequently changes with the use of the imaging cartridge as frequently changing data, and data that would not frequently change with the use of the imaging cartridge as infrequently changing data before acquiring the frequently changing data and the intermediate verification data.

17. The memory chip according to claim 13, wherein the system comprises:

a receiving module for receiving a first adjustment operation for adjusting information in the frequently changing data into infrequently changing data, and/or a second adjustment operation for adjusting information in the infrequently changing data into frequently changing data, and an adjustment module for adjusting the information in the frequently changing data into infrequently changing data based on the first adjustment operation, and adjusting the information in the infrequently changing data into frequently changing data based on the second adjustment operation.

18. The memory chip according to claim 13, wherein the system comprises:

a determination module for determining whether the infrequently changing data changes, and an update module for calculating changed infrequently changing data through the predetermined algorithm when changes are determined to have occurred to the infrequently changing data by the determination module, and updating the intermediate verification data with the calculation result obtained, or for calculating changed infrequently changing data and the frequently changing data through the predetermined algorithm when changes are determined to have occurred to the infrequently changing data by the determination module, and obtaining the verification value.

\* \* \* \* \*